106-81

CROSS REFERENCE

EXAMINER
56

United States Patent Office 2,757,193
Patented July 31, 1956

2,757,193

SULFONATION OF TURPENTINE

Arthur Edward Zoppa, New York, N. Y.

No Drawing. Application October 15, 1951,
Serial No. 251,460

3 Claims. (Cl. 260—503)

This invention relates to reaction products of terpenes, such as turpentine, with concentrated sulphuric acid, and to uses of such products. These products so described in this disclosure are suitable for use in a large number of the arts and industries where wetting agents and adhesives are employed. They appear to be of an acid nature and a large variety of salts is possible but they roughly fall into two classes, water soluble salts of the alkali metals and insoluble salts of heavy metals.

When spirit of turpentine is ordinarily added to concentrated sulphuric acid, an immediate violent reaction occurs and the mixture easily catches fire. I have succeeded in controlling this dangerous phase, by first cooling the concentrated sulphuric acid already in a tank to a temperature of 4° C. and while the acid is vigorously stirred by mechanical means, spirits of turpentine are allowed to flow into the acid. If such flow is at a rate that the temperature of the mass is kept within the range of 4° C. to 30° C. there is no loss of gases and the entire batch can be handled in open tanks, while the mass is being continually stirred by mechanical means. By this simple control of temperature of the batch it is possible to react safely enormous quantities of turpentine.

Although I do not limit myself to specified quantities of sulphuric acid to react a specified amount of turpentine, I have obtained good results by reacting equal volumes of both materials. The resulting product is easily separated by allowing to stand only about one hour and is then ready to be treated in a manner described below. But to further increase the economy of production, I have found that when I use two volumes of turpentine to one volume of concentrated (96%) sulphuric acid, the resulting product is invariably a bright clear cherry red liquid, having a honeylike, but pourable consistency and when allowed to stand in a separating funnel or column for from 8 to 12 hours according to the temperature, it separates into two fractions: An oily layer on the top that contains very little acid of reaction, and a resinous layer in the bottom intimately containing most of the acid. The product appears to be the same regardless of the proportions stated but more acid hastens separation.

The resinous bottom layer is neutralized by allowing it to run into an agitated solution of 10% sodium hydroxide having an initial temperature of at least 54° C. Provision is made to remove the heat of reaction and the temperature is controlled so as not to exceed about 84° C. I have found that if the sodium hydroxide solution is up to 54° C. no appreciable reaction takes place. When the amount of sodium hydroxide into which the said resinous bottom layer is run is equal to that calculated to neutralize the acid employed, the resulting mixture has a pH of from 7.0 to 7.5. Although I prefer to effect separation of the layers before neutralization, and the product described herein is produced in this manner, I may neutralize the entire mass containing both layers.

A product, apparently a sodium sulfonated resin or soap, floats to the top of the heavy layer component upon neutralization and when the mass has cooled the water solution of sodium sulphate is drawn out from the bottom.

I do not limit my invention to the material obtained by a complete neutralization, because in the arts the product could be desirable at a lower pH of 4 or 5, for instance, in which case the product has a different behavior. At a pH of 4 or 5 it forms opalescent solutions of concentrations up to 5% and a milky white highly dispersed solution at higher concentrations of the material. On the other hand, if a perfectly clear solution is necessary at all times and at any concentration of the material in water, a pH of 8 is recommended or even at times a pH of 10–11 or 12 might be desirable. This material would be produced without departing from the objective of the process and the manner of obtaining this sodium resinous sulfonated material.

The sodium sulfonated material obtained at a pH of 7.5 is a clear, very viscous, silky, stringy material, of amber color, soluble in water in every proportion, but insoluble in alcohol, and soluble in benzene and hydrocarbons. If 600 cc. of turpentine is used, I get about 600 grams of sodium salt of the sulfonated material and about 275 to 300 grams of mentioned oily top layer components. This sodium sulfonated material (pH 7.5) is naturally soft, does not become hard or brittle even on three years standing and due to its solubility in water, it is a very desirable binder for celluloses, especially for wood cellulose or bagasse, for producing boards, which I shall describe more fully as I proceed. It is also an excellent plasticizer for water-soluble laminating cements and binders, glues and like products that have a tendency to become hard and brittle on standing. It is useful in the textile and dyeing industry. In very weak solutions (.01–.02%) it imparts a silky sheen to cotton goods, has excellent sizing qualities for many types of textiles, especially after treatments with solutions of acid metal salts (aluminum, manganous sulfate iron etc.) which render the resinous material insoluble on the textile. It behaves in the same way as turkey red oil in dyeing, and particularly when use is made of the alizarine dyes. The textile material is first steeped in a water solution (pH 7.5) of the sulfonated resinous material, after which it is dried and is passed into a water solution of aluminum sulphate, where the aluminum readily reacts with the sulfonated material impregnated in the fibre, resulting in an insoluble salt. The textile is now ready to be dyed with the alizarin dye.

The changing of the water soluble sulfonated resin to the water insoluble, lead, iron, aluminum etc. sulfonated resin may be effected as follows:

In a tank equipped with stirring mechanism, a water solution of the sodium sulfonated resin pH 10 or distinctly alkaline temperature at 55° C. is stirred vigorously. In a separate vessel a solution of a mineral acid salt of either iron, aluminum, manganesse or lead is made, said solution being calculated to neutralize the alkalinity of the resinous solution in the tank. The acid solution is heated to a temperature of 65° C. and is then slowly poured into the sulfonated resin solution as the latter is stirred. Some heat of reaction raises the temperature of the mass. When the reaction is finished and the mass cooled off, the metallic sulfonated resin, so formed is insoluble in water, but soluble in benzol, benzine, carbon bisulphide, carbon tetrachloride etc.

The formation of water insoluble salts of the sulfonate in the presence of fibers may be employed to coat the fibers for subsequent formation into boards.

To a suitably ground bagasse fiber or cellulose material, still retaining equal or slightly in excess of its weight of water, I add ten or twenty per cent of the aforesaid water soluble sodium sulfonated resin and knead or mix thoroughly. This mix is now transferred to a tank containing 1.5% aluminum sulphate solution at a temperature of from 55° to 65° C. and while the material passes through the tank the adhering soluble sulfonated resin changes into an insoluble compound suitable as a binder for said bagasse, cementing fiber to fiber under cold pressure. Before the material leaves the aluminum sulphate tank, it is passed between rollers to squeeze out and recover excess solution of aluminum sulphate, thence, as on an endless screen, this material is washed as a continuous mat, and is then ready to be pressed to a desired thickness. The higher the pressure, either by rolls or press, the less binder is required at the end of the conveyor. The mat of bagasse thus pressed through rollers, can be cut to any desired length and inserted in standard racks to dry.

At ordinary temperature a fair to good drying of a one inch board is reached in two to three days according to temperature and atmospheric moisture. The boards thus obtained have excellent qualities. If desired, instead of the final cold pressing, the mat can be dried first and then it can be pressed in a mold at 140° to 150° C. and a pressure of 1500–2000 p. s. i. The boards thus obtained are rather dark but are endowed of great structural strength. Zinc stearate is suggested for dusting mass and mold, to prevent the board from sticking to the mold.

A minor reversal of process that I have next above described affords maximum economy in the production of a building or structural board. To make the procedure better understood, I (for illustrative purposes only) point to the glue of a postage stamp. This glue has as its sole purpose the fastening of the stamp to an envelope, and it is not intended to soak into the fiber constituting the body of the stamp. Similarly in the problem of making a building board out of fibers from crushed bagasse, the main factor is to insure a good cementing of fibers to fibers rather than attempting to soak more resinous material into the fiber proper, since the fiber possesses enough strength. To obtain the better results the suitably ground dry bagasse fiber is first steeped in an aqueous aluminum sulphate 1% to 5% solution. It is then pressed to squeeze out and recover excess solution, and transferred to a tank of 10% solution of the sodium sulfonated resin in water, the temperature of the solution being 65° C. Excess resin solution is squeezed out into separate tank, and the material is ready for pressing and rolling. The mat or board thus obtained, contains only about 2% to 4% of the resin, or less than half that required when the fibres are first treated with the resin and then neutralized. The aluminum salt is a much better binder than the free resin sulfonic acid.

A very similar action can be obtained by first coating the bagasse fibres with sodium silicate, then applying a solution of my sodium resin sulfonate, and finally applying aluminum sulphate solution before the fibres are pressed into the desired shape. As a more specific example of this modification of the process a hundred grams of air-dry bagasse, straw, shredded corn stalks, wood chips, shavings or sawdust is well mixed with from one hundred to three hundred grams of 40%–42% sodium silicate solution and then allowed to dry. This results in the formation of a glaze on the cellulosic material which is not readily penetrated by water solutions. Next, I spray the glazed particles with about 50 grams of a water solution containing 10% to 20% by weight of my sodium terpene resin sulfonate. If bagasse is used, and is in an uncompressed state after being glazed, virtually all of this solution is absorbed on the glazed fibres and none runs off. Next while the mass is still loose, I spray the mass with about 25 grams of 1% to 5% aqueous aluminum sulphate. The mass is then pressed, preferably cold, although heat may be applied, to form the desired shape such as a board. Such a board does not disintegrate on standing in water as is the case when sodium silicate is used alone or even with up to 50% Portland cement added.

*Use with rubber*

The water soluble sodium sulfonated resin is compatible with natural, neoprene, "G. R. S." and other synthetic latex, where a sulfonated resin is desirable to confer to the material certain characteristics of advantage over pure rubber obtainable from latex. Therefore this sulfonated resin may be understood to be primarily an extender of the rubber stock, a plasticizer conferring more stretch, and a softener, thus allowing more filler to be incorporated in the rubber stock. The rubber goods and tire industries can thus coagulate the mixed latex batches and obtain the rubber stock of their required formulation. Although sodium bisulphate is normally used as a coagulating agent, I have found that by using aluminum sulphate as the coagulating agent (5%–10% solutions) the stock of crepe latex thus obtained is a pure milky white, due to the aluminum oxide dispersed therein, a feature that could be desired by the rubber industry for certain of their products. The stock thus obtained is then vulcanized. As an example of mixtures possible:

I. 10% sodium sulfonated resin, pH 8 or 8.5, 90% latex
II. 50% sodium sulfonated resin, pH 8 or 8.5, 50% latex
III. 80% sodium sulfonated resin, pH 8 or 8.5, 20% latex In the case when pure latex crepe is the starting material to be dissolved in the solvents the aluminum salt of the sulfonated resin can be used in the same manner as outlined for the water soluble latex. These emulsions may be used instead of the pure sodium salts in the making of fibre boards.

I claim as my invention:
1. The process for making water-soluble alkali salts of sulfonated turpentine, comprising reacting turpentine with concentrated sulphuric acid in the absence of a substantial amount of water at a temperature between 4° C. and 30° C. to produce a mixture comprising a light layer and a heavy acidic layer, separating the light layer from the heavy layer, and at least partially neutralizing said heavy acidic layer with an alkali base.

2. The process for making terpene compounds comprising mixing one volume of 96% concentrated sulfuric acid with between one and two volumes of turpentine at a temperature between 4° C. and 30° C. which produces a mixture separable into a heavy layer and a light layer, isolating the heavy layer, and then at least partially neutralizing said heavy layer at a temperture between 54° C. and 84° C. with 10% aqueous sodium hydroxide and then removing sodium sulphate from the resulting mixture to leave a highly viscous mass.

3. The process for sulfonating turpentine comprising cooling one volume of concentrated sulfuric acid to a temperature of 4° C.; adding between one and two volumes of turpentine to the acid with constant stirring at a mixture temperature of between 4° C. and 30° C.; allowing the resulting mixture to stand for separation into a light component and a heavy component; separating the two components; neutralizing the heavy component with 10% aqueous sodium hydroxide at a temperature between 54° C. and 84° C.; then cooling the resulting mixture and separating liquid therefrom and recovering the residue.

References Cited in the file of this patent

UNITED STATES PATENTS

| | | |
|---|---|---|
| 1,265,800 | McKee | May 14, 1918 |
| 1,573,734 | Naylor | Feb. 16, 1926 |
| 1,766,304 | Petroff | June 24, 1930 |
| 1,805,467 | Dreyfus | May 19, 1931 |
| 1,871,470 | Rivat et al. | Aug. 16, 1932 |
| 1,993,415 | Rummelsburg et al. | Mar. 5, 1935 |
| 2,030,625 | Ellis | Feb. 11, 1936 |
| 2,080,077 | Howard et al. | May 11, 1937 |
| 2,163,020 | Boydan | June 20, 1939 |
| 2,194,416 | Bock | Mar. 19, 1940 |
| 2,220,678 | Cromwell et al. | Nov. 5, 1940 |
| 2,345,539 | McClellan | Mar. 28, 1944 |
| 2,350,161 | Gloor | May 30, 1944 |
| 2,375,140 | Semon | May 1, 1945 |
| 2,383,762 | Bloch et al. | Aug. 28, 1945 |
| 2,446,304 | Roman | Aug. 3, 1948 |